Patented Sept. 29, 1925.

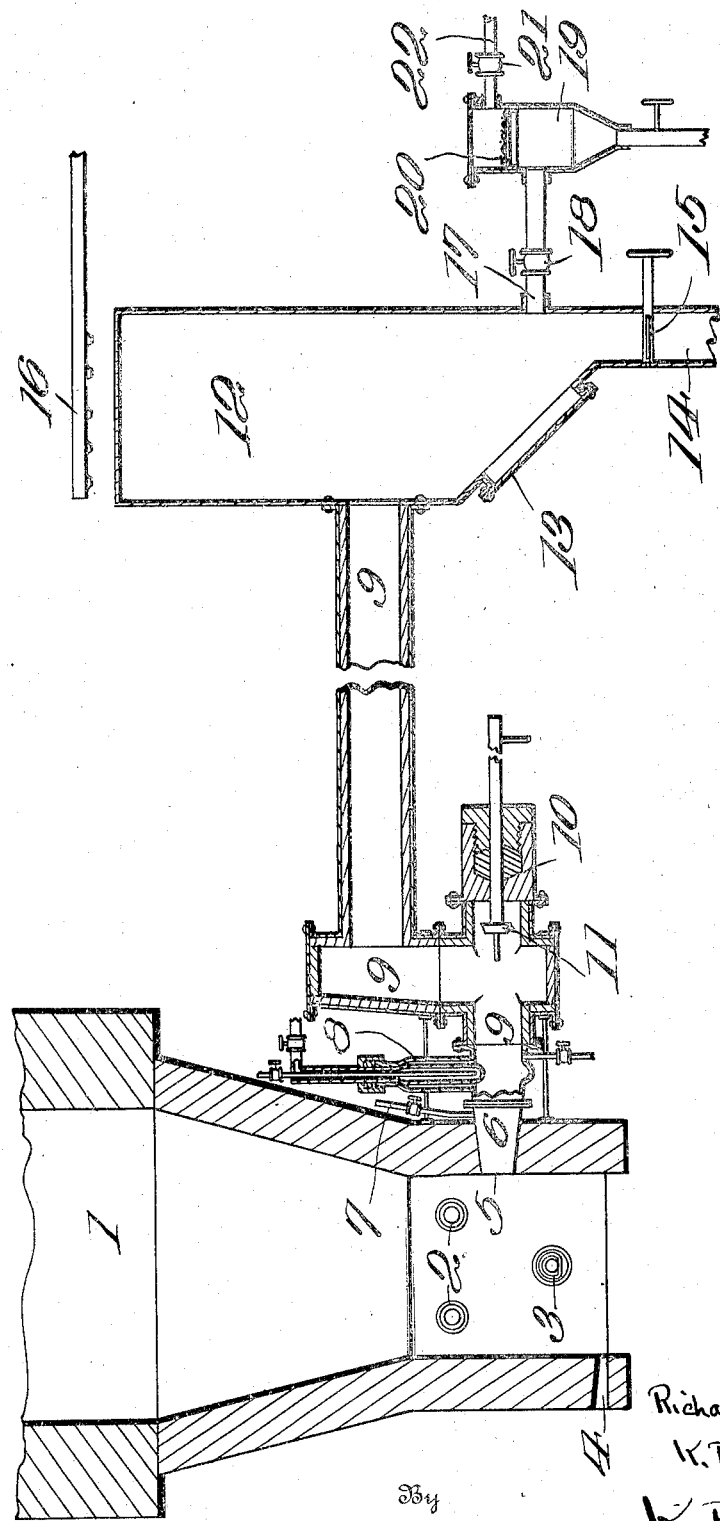

1,555,784

UNITED STATES PATENT OFFICE.

RICHARD FRANCHOT AND KARL P. McELROY, OF WASHINGTON, DISTRICT OF COLUMBIA, ASSIGNORS TO FERRO CHEMICALS INC., OF WASHINGTON, DISTRICT OF COLUMBIA, A CORPORATION OF DELAWARE.

BLAST FURNACE.

Application filed December 17, 1923. Serial No. 681,186.

*To all whom it may concern:*

Be it known that we, RICHARD FRANCHOT and KARL P. McELROY, citizens of the United States, residing at Washington, District of Columbia, have invented certain new and useful Improvements in Blast Furnaces, of which the following is a specification.

This invention relates to improvements in blast furnaces and it comprises a process of operating blast furnaces making iron or ferro alloys wherein a definite small proportion of the gases produced in the hearth is withdrawn directly from the hearth region and the burden is adjusted in direct proportion with the proportion of gas withdrawn, the concentration of volatile matter in the hearth being definitely limited relative to the the input of volatile matter to the furnace; and it further comprises the combination of a blast furnace provided with gas outlet located below the tuyère level with gas conducting means adapted to engage with such outlet, with means for recovering condensible matter from said gases and with means for adjusting the flow of gas through such outlet; all as more fully hereinafter set forth and as claimed.

In the usual operation of a blast furnace smelting iron ores with coke the useful development of the fuel combustion energy in the furnace is limited to about one-half. The equivalent of about 70 per cent of the coke carbon burned leaves the furnace as CO in the top gas and only about 30 per cent of the carbon burned is oxidized from CO to $CO_2$. In other words the ore burden and hence the ratio of iron produced to coke burned is limited to less than half that which would result were the energy of the coke fully developed and utilized in useful smelting work and in supplying the unavoidable heat losses. In smaller furnaces burning wood charcoal the $CO_2$ ratio and thus the percentage of energy development is usually somewhat higher than in coke furnaces and the fuel consumption per ton of iron correspondingly lower. The small development of the fuel energy in the furnace, when burning either coke or charcoal, is due to the lack of balance between hearth and shaft which results from the necessity of burning so much fuel with air in order to maintain the hearth heat that the gases produced carry into the shaft a great excess of heat and of reducing energy.

We have elsewhere, as in Patent No. 1,466,644, described processes and means for adjusting the balance between hearth and shaft heat wherein a substantial quantity of the hearth gases is diverted from the furnace at the hot zone and the quantity of residual gas caused to rise through the shaft is regulated in accordance with the shaft requirements. So doing, the proportion of the hearth gases which is so diverted may be quite large; 23 per cent or more, or sufficient gas may be diverted to supply the fuel requirements of the blast stoves and of the boilers. Any desired proportion of gas may be diverted and the burden is adjusted in inverse proportion to the quantity of gas diverted. The described diversion of gas at a high temperature takes out of the furnace alkali and similarly volatile salines as vapors with the gas, substantially prevents the accumulation of such salines in the furnace and hence largely prevents transfer of heat from hearth to shaft in form of the latent vaporization heat of salines.

We have discovered that in the usual blast furnace practice the accumulation of alkalis and similar substances in the furnace is or may be the controlling factor underlying the fuel economy of the furnace. Potash and soda, which usually occur, although sometimes only in exceedingly small proportions, in the coke, ore and limestone, have been found in a relatively very large concentration in the form of cyanide and other vapors in the hearth gases, a concentration many times that which would be assumed from the very small content of alkali in the stock put into the furnace. The accumulation is large as compared to the input. We have found this concentration multiple (so to speak) relative to the alkali input to be sometimes as high as from 30 to 50. Evidently accumulation of the alkalis put into the furnace goes forward, through a process of successive vaporization and condensation, until a balance or equilibrium is established between the input of alkali and the outgo thereof in the slag and in the top gas as colloidally suspended fume or smoke. Before this equilibrium is reached the above described concentration multiple is attained and the accumulated alkalis are in continuous circulation between hearth and shaft and back again. This circulation causes an absorption of heat in the hearth to be set free in the shaft and the transfer of heat in this way by the very large quantity of volatile matter which has been found in the ascending gases and in the materials reaching the hot zone is sufficient to account for a large proportion of the hearth heat, that is, the heat available for the work done at the high temperature of the hearth and bosh. We have found, through measurement of the concentration of alkali and nitrogen compounds in the gases of the hearth region, that in many furnaces, a greater proportion of the available hearth heat is absorbed in the vaporization of these compounds than in the useful work of heating iron and slag, reduction of the metal constituents etc. The lack of balance between hearth and shaft in furnaces generally may be construed to be largely due to the necessity of keeping in circulation relatively large amounts of accumulated saline matter. The accumulation of alkali and similar substances may be regarded as a large, outstanding, primary factor limiting the burden and hence the development of the fuel energy.

We have found that the withdrawal from the hearth region of a very small proportion of the gases produced in the combustion zone, when accompanied by a substantial increase of burden, results in a very marked improvement of the furnace action, compared to the usual practice without gas withdrawal. We find that, by adjusting within a narrow range the small ratio of the amount of gas withdrawn to that of the gases going through the shaft, thus adjusting the concentration multiple of the saline (cyanide) vapors in the hearth gases, and by arranging the burden ratio in inverse proportion with the concentration multiple, we secure control, within wide limits, of fuel economy, that is, of the respective proportions of the fuel energy absorbed in the work of making iron on the one hand, and delivered as fuel gas on the other. We are able to improve efficiency of operation generally, as compared with prior practice, by making more iron while burning less coke. By withdrawing, for example, five per cent of the hearth gases the concentration of alkali therein is limited to not more than 20 times that due to the alkali input. With a withdrawal ratio of 10 per cent of the hearth gas, the alkali concentration multiple is limited to 10. With a given alkali input and with an increase of the ratio of gas withdrawal from 5 per cent to 10 per cent of the total hearth gases, the effect of alkali accumulation is substantially diminished and if, while so increasing the gas withdrawal, the burden be increased by a substantial percentage, then the production of metal is proportionately increased, its quality improved and at the same time the daily consumption of coke is less. In some cases a withdrawal of an average of less than 3 per cent of the hearth gases, combined with a 10 per cent increase of the burden, effects a substantial improvement in fuel economy and in uniformity of operation and this improvement is markedly extended by increase of the quantity of gas withdrawn to five or six per cent of the total gases produced and by a corresponding increase of burden.

Withdrawal of gas from the hearth region of the furnace may be by any suitable and convenient means. The gas may be withdrawn either continuously or at suitable intervals. As before stated, the effectiveness of hot gas withdrawal lies in the limitation of saline accumulation in the furnace and for this any method or means will serve which removes saline matter from the furnace at an average rate faster than that at which alkalis and other salines are put into the furnace with the materials charged. One or more water cooled gas outlets may be put in the furnace wall, each outlet being controlled by a water cooled valve, and from the valve controlled outlet a conduit in the form of a T or cross may lead at an angle to a cooled chamber, the straight opening of the T or cross ending in a stuffing box through which a poking bar may be operated to keep open the gas outlet. Adjustment of the gas flow from the furnace is facilitated by a second valve located in the gas line beyond the cooled chamber. This chamber is adapted to condense and separate alkali (potash) and nitrogen compounds and other condensible matter from the gases. Suitable filtering means may be put in circuit. In this way valuable byproducts of the smelting operation are obtained. We may locate the gas outlets at convenient points in the furnace wall either above or below the top of the bosh. We have found it advantageous to put gas outlets below the tuyère level and to draw gas from the furnace at times when the slag level in the furnace is below said gas outlets. In particular, we have utilized the slag notch as gas outlet, drawing cyanide laden gases from the furnace for an hour or more soon after casting iron, when the liquid level is well below the slag notch. An advantage of thus drawing gas at intervals is that the gas conduits may be removed during the intervals for cleaning. A combination of continuous and intermittent gas withdrawal works well.

In the accompanying illustration are shown, more or less diagrammatically, apparatus elements within the present invention.

In this showing the structure 1 represents in vertical section the lower part, comprising the bosh and hearth, of a blast furnace, provided as usual with tuyères 2 and with slag notch 3 and iron hole 4. In the furnace wall below the tuyères, as shown, is gas outlet 5 in which is cooler 6 supplied with water through valved pipe 7. Engaging with the cooled outlet is water-cooled valve 8 flanged to the cooler and connected with refractory lined conduit 9 in the form of a double T provided, at its opening in line with the gas outlet, with stuffing box 10. Through the stuffing box, which may be packed with asbestos or other suitable refractory packing, is poker 11 adapted to clear the outlet for gas from the furnace and, upon occasion, to close said outlet. The conduit 9 leads to sheet metal chamber 12, having a hopper shaped bottom, manhole 13, and chute 14 with damper 15. Above the chamber is water nozzle 16 adapted to spray the chamber externally with cooling water. From the chamber the gas line 17 leads through valve 18 to filtering chamber 19 containing filter 20. From the filter the gas line is continued through valve 21 and pipe 22 to a place of use for the gas.

In drawing gas from the furnace continuously valve 8 is usually wide open, the normal pressure in the furnace causing a flow of gas through conduit 9 into chamber 12, the velocity of gas flow being controlled by means of valves 18 and 21. The size and number of the gas outlets is designed to permit withdrawing the desired amount of gas at the desired velocity. The gas flow is thus so adjusted that there is a substantial positive pressure in 12 without an undue pressure differential between the furnace and the conduit 9 and hence with a sufficiently low gas velocity at 5 to prevent an undue amount of coke, slag etc. being carried from the furnace. The cyanides and other compounds carried as vapor in the very hot gas as it leaves the furnace are condensed and deposited as the relatively small volume of hot gas enters 12 and becomes mixed with the previously cooled large body of gas in 12. Matter carried in suspension in the gas is filtered out in 19.

As before stated, any desired number of gas outlets may be located at desired points, either in the bosh wall, in the in-wall above the top of the bosh, or in the hearth wall below the tuyère level. In operating the latter means for drawing gas, care should be taken to keep the liquid level in the furnace below the gas outlets. In discontinuous operation of an outlet the knob of the poker 11 may be adapted to close the outlet to prevent slag running out.

What we claim is:

1. In the operation of blast furnaces producing iron or ferro-alloy, the process which comprises withdrawing from the hot zone a certain proportion of the gases produced in the hearth and adjusting the burden ratio in direct proportion with the quantity of gases so withdrawn.

2. In the operation of blast furnaces producing iron or ferro-alloy, the process which comprises withdrawing gas from the furnace at the hot zone, the quantity of gas so withdrawn being an average of less than ten per cent of the gases produced in the hearth, and increasing the burden relative to the burden charged without so withdrawing gases.

3. In the operation of blast furnaces producing iron or ferro-alloy, the process which comprises withdrawing gas from the furnace through outlet provided in the hot zone, the quantity of gas so withdrawn being not more than that sufficient to limit the average concentration of volatile saline vapors in the hearth gases to ten times the vapor concentration which would be due to the input of such volatile salines to the furnace.

4. In the operation of blast furnaces producing iron or ferro-alloy, the process of increasing production which comprises withdrawing an adjusted volume of gas from the furnace at a level below that of the tuyères.

5. In smelting apparatus, the combination of a blast furnace provided with gas outlet located below the tuyère level with valve controlled gas conducting means adapted to engage with said outlet.

6. In smelting apparatus, a blast furnace provided with gas outlet means located below the tuyère level and adapted to deliver into a gas conduit leading to a condensing chamber of substantial size adapted to materially diminish the velocity of passing gases.

In testimony whereof, we affix our signature hereto.

RICHARD FRANCHOT.
KARL P. McELROY.